United States Patent
Cheng

(10) Patent No.: US 8,654,619 B1
(45) Date of Patent: Feb. 18, 2014

(54) METHOD AND APPARATUS FOR OPERATING A DISK DRIVE

(75) Inventor: Glenn Chek Heong Cheng, Kuala Lumpur (MY)

(73) Assignee: Western Digital Technologies, Inc., Irvine, CA (US)

( * ) Notice: Subject to any disclaimer, the term of this patent is extended or adjusted under 35 U.S.C. 154(b) by 274 days.

(21) Appl. No.: 13/248,903

(22) Filed: Sep. 29, 2011

(51) Int. Cl.
*G11B 7/00* (2006.01)

(52) U.S. Cl.
USPC ........................................ 369/44.32

(58) Field of Classification Search
None
See application file for complete search history.

(56) References Cited

U.S. PATENT DOCUMENTS

| | | | |
|---|---|---|---|
| 5,418,940 | A | 5/1995 | Mohan |
| 5,797,022 | A | 8/1998 | Shimotono et al. |
| 5,895,488 | A | 4/1999 | Loechel |
| 6,191,712 | B1 | 2/2001 | Still |
| 6,412,045 | B1 | 6/2002 | DeKoning et al. |
| 6,754,860 | B2 * | 6/2004 | Kim et al. .............. 714/723 |
| 6,924,952 | B1 | 8/2005 | Brunnett et al. |
| 6,925,526 | B2 | 8/2005 | Hall |
| 7,076,605 | B1 | 7/2006 | Son |
| 7,080,200 | B2 | 7/2006 | Hassner et al. |
| 7,277,986 | B2 | 10/2007 | Morley et al. |
| 7,574,558 | B2 | 8/2009 | Morley et al. |
| 7,870,446 | B2 | 1/2011 | Kurashige |
| 2008/0005465 | A1 | 1/2008 | Matthews |
| 2008/0005467 | A1 | 1/2008 | Morley et al. |
| 2009/0021853 | A1 | 1/2009 | Park |
| 2010/0011168 | A1 | 1/2010 | Ryu et al. |
| 2010/0079904 | A1 | 4/2010 | Sato |
| 2012/0137056 | A1 | 5/2012 | Keays |

FOREIGN PATENT DOCUMENTS

KR 0303217 B1 7/2001

* cited by examiner

*Primary Examiner* — Joseph Feild
*Assistant Examiner* — Parul Gupta

(57) ABSTRACT

A disk drive is disclosed including a rotatable disk having a user area including a first sector, and a spare area including a second sector, and configured to store a relocation list. The disk drive also includes a controller configured to receive a write command to write first data to the first sector, determine that the first data includes an amount of data less than a storage capacity of the first sector, read second data in the first sector, determine that there is a read error when reading the second data in the first sector, temporarily relocate the first sector to the second sector, maintain the second data in the first sector, and perform a test on the first sector to determine whether to copy the first data to the first sector, or permanently relocate the first sector to the second sector.

24 Claims, 3 Drawing Sheets

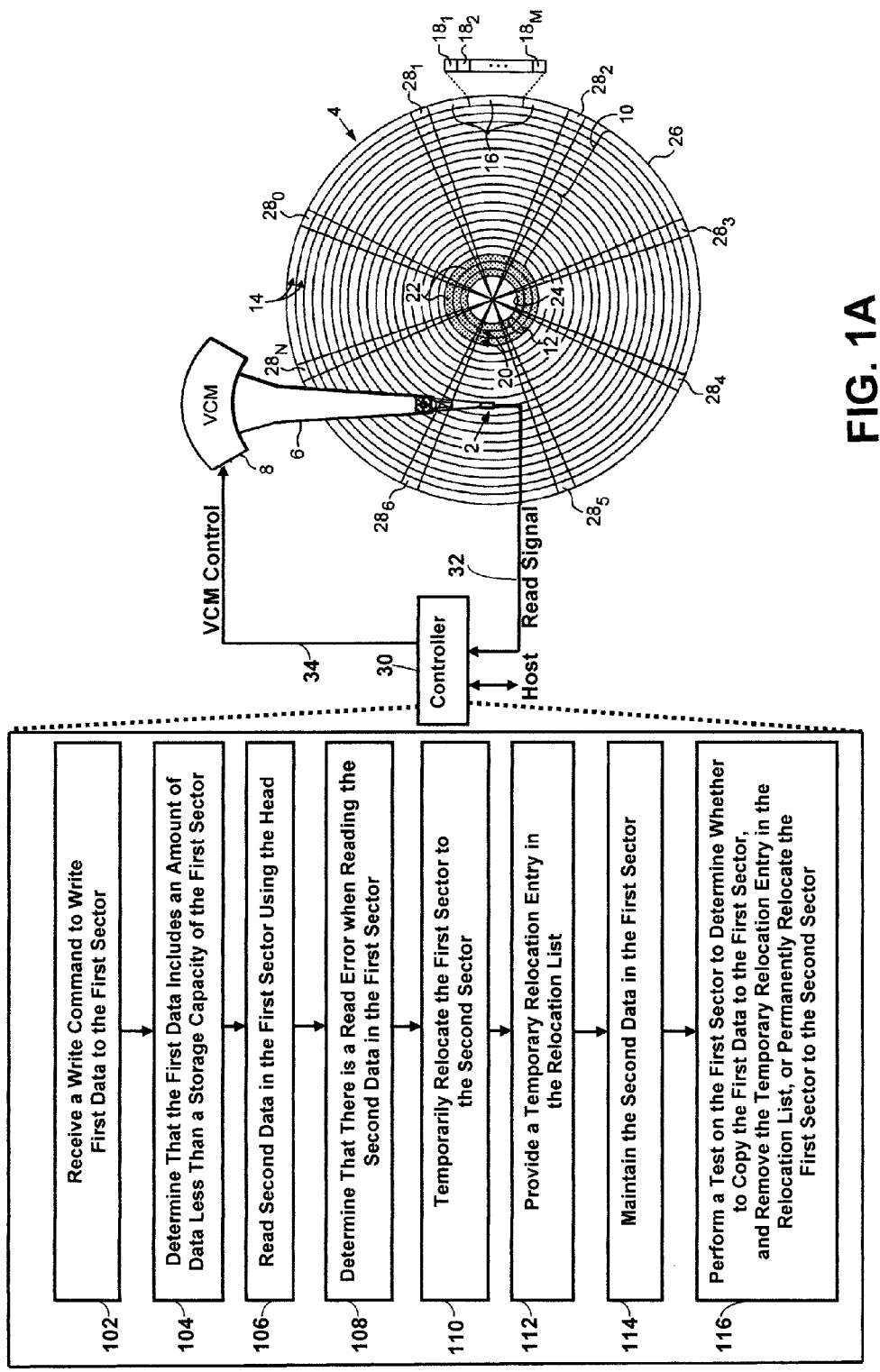

| Host LBA | 0 | 1 | 2 | 3 | 4 | 5 | 6 | 7 |
|---|---|---|---|---|---|---|---|---|
| Physical Disk Sector | | | | Sector 1 (User Area) | | | | |

FIG. 2

(Partial map =0xF0)

| Host LBA | 0 | 1 | 2 | 3 | 4(0x4C) | 5(0x4C) | 6(0x4C) | 7(0x4C) |
|---|---|---|---|---|---|---|---|---|
| Physical Disk Sector | | | | | Pseudo Relocated (SPARE) | | | |

FIG. 3

(Partial map = 0xF0)

| Host LBA | 0 | 1 | 2 | 3 | 4(Good) | 5 (Good) | 6(Good) | 7(Good) |
|---|---|---|---|---|---|---|---|---|
| Physical Disk Sector | | | | | Pseudo Relocated (SPARE) | | | |

FIG. 4

SST Pass

| Host LBA | 0 | 1 | 2 | 3 | 4 | 5 | 6 | 7 |
|---|---|---|---|---|---|---|---|---|
| Physical Disk Sector | | | | Relocate Back to Sector 1(User Area) | | | | |

FIG. 5

| Host LBA | 0 | 1 | 2 | 3 | 4 | 5 | 6 | 7 |
|---|---|---|---|---|---|---|---|---|
| Physical Disk Sector | | | | Permanently Relocated to Sector 2 (Spare Area) | | | | |

METHOD AND APPARATUS FOR OPERATING A DISK DRIVE

BACKGROUND

Disk drives comprise a disk that includes data tracks with physical sectors for storing host data, where the physical sectors have a particular size, such as a 512 byte or a 4 kilobyte (4 KB) size. Traditionally, the host transfers data to the disk drive in logical block address (LBA) size units that are equal in size to the physical sectors on the disk.

However, in a disparate sector size environment, where the host LBA size is smaller than the disk drive physical sector size, the host can issue a write command with less than a full physical sector amount of data. Since the disk drive can only read or write whole physical sectors, a read-modify-write operation is performed to update the physical sector with the host provided data while preserving existing data not provided with the current host write command.

However, if an uncorrectable error, such as an uncorrectable error correcting code (ECC) error, occurs during the read portion of the read/modify/write operation, the stored data in the physical sector cannot be read. As a result, the physical sector is typically written with a combination of valid data provided by the host write command and fill data, which is invalid data that can be read. Thus, the physical sector is overwritten with new data.

However, when the original data is overwritten, failure analysis will not be able to be performed on the physical sector because the original data in its original state has been overwritten.

BRIEF DESCRIPTION OF THE DRAWINGS

The features and advantages of the present embodiments of the present invention will become more apparent from the detailed description set forth below when taken in conjunction with the drawings, wherein:

FIG. 1A is a disk drive including a controller and a disk having a user area and a spare area according to an embodiment of the present invention;

FIG. 1B is a flow chart corresponding to a process for a controller in a disk drive according to an embodiment of the present invention;

FIG. 2 depicts logical block addresses corresponding to a sector in a disk according to an embodiment of the present invention;

FIG. 3 depicts logical block addresses corresponding to a sector in a disk which has been temporarily relocated according to an embodiment of the present invention;

FIG. 4 depicts logical block addresses corresponding to a sector in a disk which has been temporarily relocated according to an embodiment of the present invention;

FIG. 5 depicts logical block addresses corresponding to a sector in a disk which has been unrelocated according to an embodiment of the present invention;

FIG. 6 depicts logical block addresses corresponding to a sector in a disk which has been permanently relocated according to an embodiment of the present invention.

DETAILED DESCRIPTION

Figure 7:
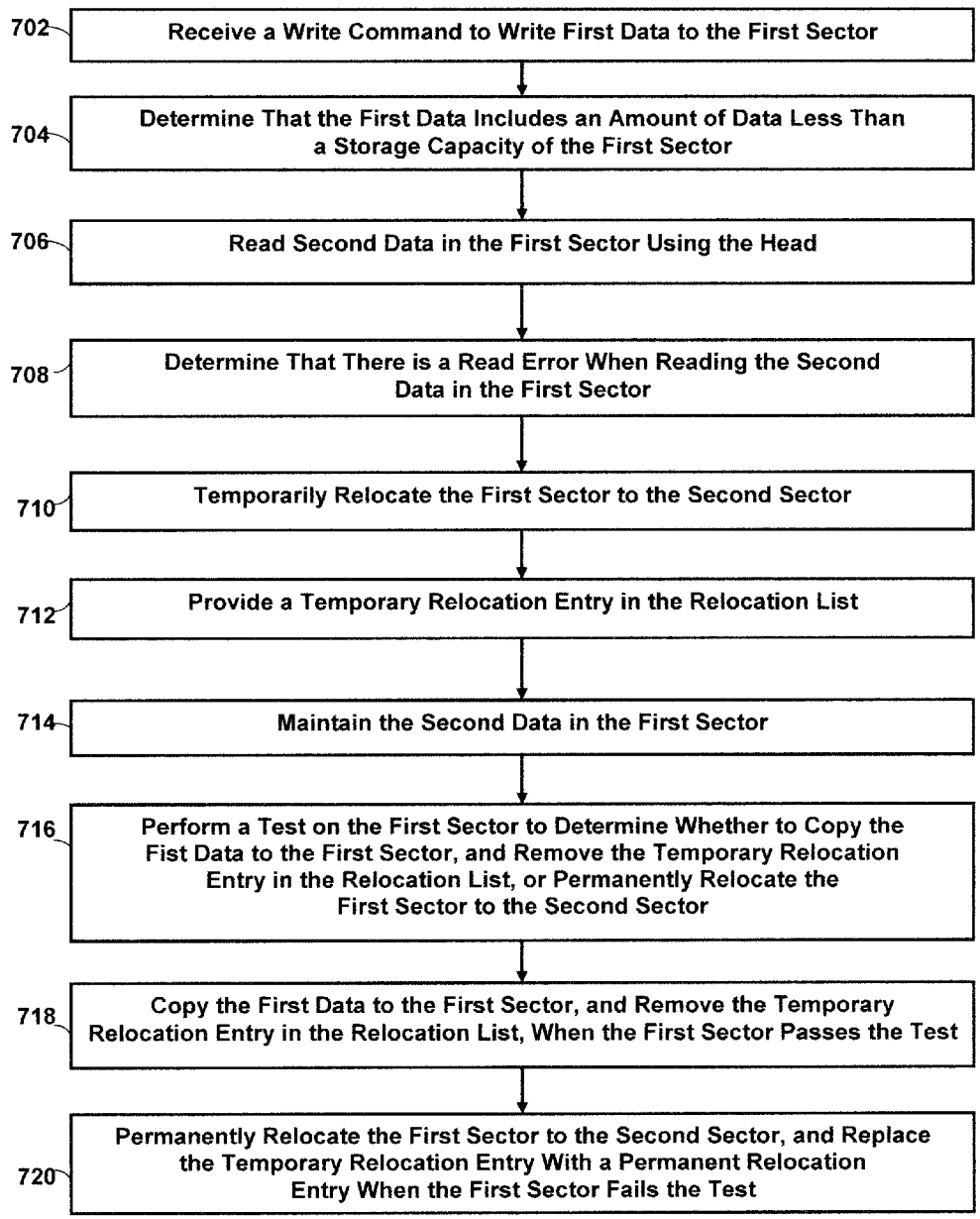
FIG. 7 depicts a process according to an embodiment of the present invention.

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

FIG. 1A shows a disk drive according to an embodiment of the present invention comprising a head 2 actuated radially over a disk 4 by an actuator arm 6, and a voice coil motor (VCM) 8 operable to rotate the actuator arm 6 about a pivot. The disk 4 comprises a user area 10 and a spare area 12. The user area 10 comprises a plurality of data tracks 14, wherein each data track 14 comprises a plurality of physical sectors 16. The plurality of physical sectors 16 in the user area 10 can be addressed and used by the host for reading and writing data.

Each physical sector 16 corresponds to a plurality of logical block addresses (LBAs) $18_1$-$18_M$, wherein each LBA $18_1$-$18_M$ corresponds to host data stored in the physical sector 16. In one embodiment, each physical sector 16 corresponds to eight LBAs, wherein each physical sector 16 has a 4 kilobyte size and each LBA has a 512 byte size. In another embodiment, each physical sector 16 may correspond to less than eight LBAs, wherein each LBA has a size of 512 bytes. In the embodiment of FIG. 1A, the host sends and requests data corresponding to one or more LBAs, while the disk drive writes and reads data in full physical sectors, wherein each physical sector stores an amount of data corresponding to multiple LBAs.

In the embodiment of FIG. 1A, the spare area 12 comprises a plurality of data tracks 20, wherein each data track 20 comprises a plurality of physical sectors 22. The plurality of physical sectors 22 in the spare area 12 are not directly addressable by the host (i.e., they are hidden from the host), but can be used by the disk drive for relocation of defective physical sectors in the user area 10 of the disk 4. Each physical sector 22 in reserved area 12 has a same size, such as 4 kilobytes, as each physical sector 16 in host addressable area 10. In the embodiment in FIG. 1A, the spare area 12 is located near an inner diameter 24 of the disk 4. However, the spare area 12 may be located at any suitable location on the disk 4, such as near an outer diameter 26 of the disk 4, or anywhere between the inner diameter 24 and the outer diameter 26 of the disk 4.

In the embodiment in FIG. 1A, the disk 4 further comprises a plurality of embedded servo sectors $28_1$-$28_N$ that define the data tracks 14 in the user area 10 and the data tracks 20 in the reserved area 12. The disk drive further comprises a controller 30, which is configured to process a read signal 32 emanating from the head 2 to demodulate the embedded servo sectors $28_1$-$28_N$ and generate a position error signal (PES). The PES represents a radial offset of the head 2 from a target data track 14 in the user area 10 or a target data track 20 in the spare area 12. The controller 30 is further operable to process the PES with a suitable servo compensator to generate a VCM control signal 34 applied to the VCM 8. The VCM 8 rotates the actuator arm 6 about the pivot in order to actuate the head 2 radially over the disk 4 in a direction that decreases the PES.

The controller 30 may be implemented using one or more processors for executing instructions and may further include memory, such as a volatile or non-volatile memory, for storing data (e.g., data being processed) and/or instructions. The instructions may be executed by the one or more processors to perform the various functions of the controller 30 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

In one embodiment, the controller 30 can write data to the disk 4 as shown, for example, in FIG. 1B. In the embodiment of FIG. 1B, the controller 30 receives a write command to write first data to the first sector as shown in Step 102. For example, the controller 30 can receive a write command from a host to write first data to a first sector in the disk 4. In an embodiment, the first sector can be Sector 1 located in the user area 10 as shown in FIG. 2.

In Step 104, the controller 30 determines that the first data includes an amount of data less than a storage capacity of the first sector. For example, the controller 30 can determine that the first data includes 512 bytes of data, which is less than the 4k storage capacity of the first sector. In one embodiment, as seen in FIG. 2, Sector 1 can comprise Host LBAs 0-7. The Host LBAs 0-7 can each be 512 bytes of data. Thus, to write data for each of the Host LBAs 0-7 would entail writing 512 bytes of data, which is less than the 4k storage capacity of Sector 1.

In Step 106, the controller 30 reads second data in the first sector using the head 2. In an embodiment, the data stored in Sector 1 can be the second data. For example, the controller 30 can read the data stored in Sector 1 including the data stored in the Host LBAs 0-7. Also, in an embodiment, the controller 30 can read the second data prior to attempting to write the first data from the host.

In Step 108, the controller 30 determines that there is a read error when reading the second data in the first sector. For example, the controller 30 can determine that there is a read error when reading the data in Sector 1. In one embodiment, the data corresponding to the Host LBAs 4-7 could be unreadable. Furthermore, in an embodiment, the controller 30 can determine that there is a read error during a read/modify/write operation. Also, in one embodiment, the controller 30 can also determine whether the read error is an uncorrectable read error or not.

In Step 110, the controller 30 temporarily relocates the first sector to the second sector. For example, the controller 30 can temporarily relocate the first sector from Sector 1 to Sector 2 when there is a read error in Sector 1. Sector 2 can be relocated in the spare area 12. Thus, the first data from the host can be written to Sector 2 instead of Sector 1. Furthermore, optional third data can also be written to Sector 2. The third data can be written in place of the unreadable data in the first sector. For example, the third data can be written in the Host LBAs 4-7.

In one embodiment, as shown in FIG. 3, the third data is fill data exemplified as 0x4c. However, the fill data can be other data aside from 0x4c. For example, the fill data could be error indication codes, invalid data, or even random or pseudo-random data. In an embodiment, the controller 30 temporarily relocates the first sector to the second sector when the read error is determined to be an uncorrectable read error. In one embodiment, the read error can be, for example, an error caused by a write splice, or high fly writes.

In Step 112, the controller 30 provides a temporary relocation entry in the relocation list. In one embodiment, the disk 4 can store a relocation list indicating relocations of sectors in the disk 4. The controller 30 can thus provide a temporary relocation entry in the relocation list to indicate that Sector 1 has been relocated to Sector 2. In an embodiment, the relocation list can also be stored in other memory units aside from the disk 4. For example, the other memory units can include a non-volatile memory accessible by the controller 30.

In Step 114, the controller 30 maintains the second data in the first sector. For example, instead of overwriting the second data in Sector 1, the controller 30 can maintain the second data in Sector 1. That is, instead of writing the first data from the host to Sector 1, which would overwrite the second data in Sector 1, the first data is written in the spare area 12, such as in Sector 2. In one embodiment, this can allow failure analysis to be performed on the second data in Sector 1, which contains read errors.

In Step 116, the controller 30 performs a test on the first sector to determine whether to copy the first data to the first sector, and remove the temporary relocation entry in the relocation list, or permanently relocate the first sector to the second sector. For example, the controller 30 can perform a test on Sector 1 to determine whether to copy the first data to the first sector, and remove the temporary relocation entry in the relocation list, or permanently relocate Sector 1 to Sector 2.

In one embodiment, the test can be, for example, a surface scan test. The surface test can include, for example, writing test data to Sector 1 and reading the test data from Sector 1 a predetermined amount of times. The controller 30 can determine that Sector 1 passes the surface scan test when there is no write error and no read error. However, the controller 30 can determine that Sector 1 fails the surface scan test when there is a write error or a read error. In an embodiment, the test can determine when the sector can reliably store data Furthermore, in one embodiment, as shown in FIG. 4 the controller 30 can perform the test on Sector 1 when Sector 2 is filled with valid data. In another embodiment, the controller 30 can perform the test on Sector 1 after a predetermined amount of time has lapsed since Sector 1 was temporarily relocated to Sector 2.

In one embodiment, the present invention can also include a process as shown in FIG. 7. In FIG. 7, Steps 702-716 correspond to Steps 102-116 in FIG. 1B. Thus, a description for Steps 702-716 will not be repeated.

In Step 718, the controller 30 copies the first data to the first sector, and remove the temporary relocation entry in the relocation list, when the first sector passes the test. The test can be, for example, the surface scan test disclosed above. For example, the controller 30 can copy the first data to Sector 1, and remove the temporary relocation in the relocation list, when Sector 1 passes the test. In one embodiment, this can be seen in FIG. 5 where Sector 1 has been relocated from Sector 2 in the spare area 12 back to its original location in the user area 10.

In Step 720, the controller 30 permanently relocates the first sector to the second sector, and replaces the temporary relocation entry with a permanent relocation entry when the first sector fails the test. For example, the controller 30 can permanently relocate Sector 1 to Sector 2, and replace the temporary relocation entry with a permanent relocation entry when Sector 1 fails the test. In one embodiment, the permanent relocation can be seen in FIG. 6 where Sector 1 has been permanently relocated to Sector 2. Sector 1 can fail the test, for example, when the controller 30 determines that there is a read error or a write error.

Furthermore, in one embodiment, a limit can be placed on a number of temporary and/or permanent relocations of sectors to the spare area 12. For example, the disk 4 can store, for example, a relocation count, and a maximum relocation amount. The relocation count can correspond to the number of temporary and/or permanent relocations of sectors to the spare area 12. The maximum relocation amount can correspond to the maximum number of temporary and/or permanent relocations of sectors to the spare area 12. When the relocation count exceeds the maximum relocation amount, the controller 30 can halt relocation of sectors to the spare area 12 until the relocation count is less than the maximum relocation amount.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A disk drive comprising:
    a rotatable disk having a user area including a first sector, and a spare area including a second sector, and configured to store a relocation list;
    a head actuated over the disk and configured to read from the disk and write to the disk; and
    a controller configured to:
        receive a write command to write first data to the first sector;
        determine that the first data includes an amount of data less than a storage capacity of the first sector;
        read second data in the first sector using the head;
        determine that there is a read error when reading the second data in the first sector;
        temporarily relocate the first sector to the second sector;
        provide a temporary relocation entry in the relocation list;
        maintain the second data in the first sector; and
        perform a test on the first sector to determine whether to copy the first data to the first sector, and remove the temporary relocation entry in the relocation list, or permanently relocate the first sector to the second sector.

2. The disk drive of claim 1 wherein the test is a surface scan test on the first sector.

3. The disk drive of claim 2 wherein the surface scan test on the first sector includes writing test data to the first sector and reading the test data from the first sector a predetermined number of times, wherein the first sector passes the surface scan test when there is no write error and no read error, and the first sector fails the surface scan test when there is a write error or a read error.

4. The disk drive of claim 1 wherein the controller is further configured to write the first data to the second sector.

5. The disk drive of claim 4 wherein the controller is further configured to write third data to the second sector in addition to the first data.

6. The disk drive of claim 5 wherein the third data is fill data.

7. The disk drive of claim 1 wherein the controller is further configured to test the first sector when the second sector is filled with valid data.

8. The disk drive of claim 1 wherein the controller is further configured to test the first sector after a predetermined amount of time has lapsed since the first sector was temporarily relocated to the second sector.

9. The disk drive of claim 1 wherein the controller is further configured to
    copy the first data to the first sector, and remove the temporary relocation entry in the relocation list, when the first sector passes the test, and
    permanently relocate the first sector to the second sector, when the first sector fails the test.

10. The disk drive of claim 9 wherein the controller is further configured to replace the temporary relocation entry with a permanent relocation entry when the first sector is permanently relocated to the second sector.

11. The disk drive of claim 1 wherein the controller is further configured to determine that there is the read error during a read/modify/write operation.

12. The disk drive of claim 1 wherein the controller is further configured to determine that the read error is an uncorrectable read error before temporarily relocating the first sector to the second sector.

13. A method for operating a disk drive including a rotatable disk having a user area including a first sector, and a spare area including a second sector, and configured to store a relocation list, and a head actuated over the disk comprising:
    receiving a write command to write first data to the first sector;
    determining that the first data includes an amount of data less than a storage capacity of the first sector;
    reading second data in the first sector using the head;
    determining that there is a read error when reading the second data in the first sector;
    temporarily relocating the first sector to the second sector;
    providing a temporary relocation entry in the relocation list;
    maintaining the second data in the first sector; and performing a test on the first sector to determine whether to copy the first data to the first sector, and remove the temporary relocation entry in the relocation list, or permanently relocate the first sector to the second sector.

14. The method of claim 13 wherein performing the test on the first sector includes performing a surface scan test on the first sector.

15. The method of claim 14 wherein performing the surface scan test on the first sector includes
writing test data to the first sector and reading the test data from the first sector a predetermined number of times, wherein the first sector passes the surface scan test when there is no write error and no read error, and the first sector fails the surface scan test when there is a write error or a read error.

16. The method of claim 13 further comprising writing the first data to the second sector.

17. The method of claim 16 further comprising writing third data to the second sector in addition to the first data.

18. The method of claim 17 wherein the third data is fill data.

19. The method of claim 13 wherein the step of testing the first sector includes testing the first sector when the second sector is filled with valid data.

20. The method of claim 13 wherein the step of testing the first sector includes testing the first sector when a predetermined amount of time has lapsed since the first sector was temporarily relocated to the second sector.

21. The method of claim 13 further comprising
copying the first data to the first sector, and removing the temporary relocation entry in the relocation list, when the first sector passes the test; and
permanently relocating the first sector to the second sector, when the first sector fails the test.

22. The method of claim 21 further comprising replacing the temporary relocation entry with a permanent relocation entry when the first sector is permanently relocated to the second sector.

23. The method of claim 13 further comprising determining that there is the read error during a read/modify/write operation.

24. The method of claim 13 further comprising determining that the read error is an uncorrectable read error before temporarily relocating the first sector to the second sector.

* * * * *